(No Model.)
C. E. HOLLEY.
VEHICLE RUNNING GEAR.
No. 452,376. Patented May 19, 1891.
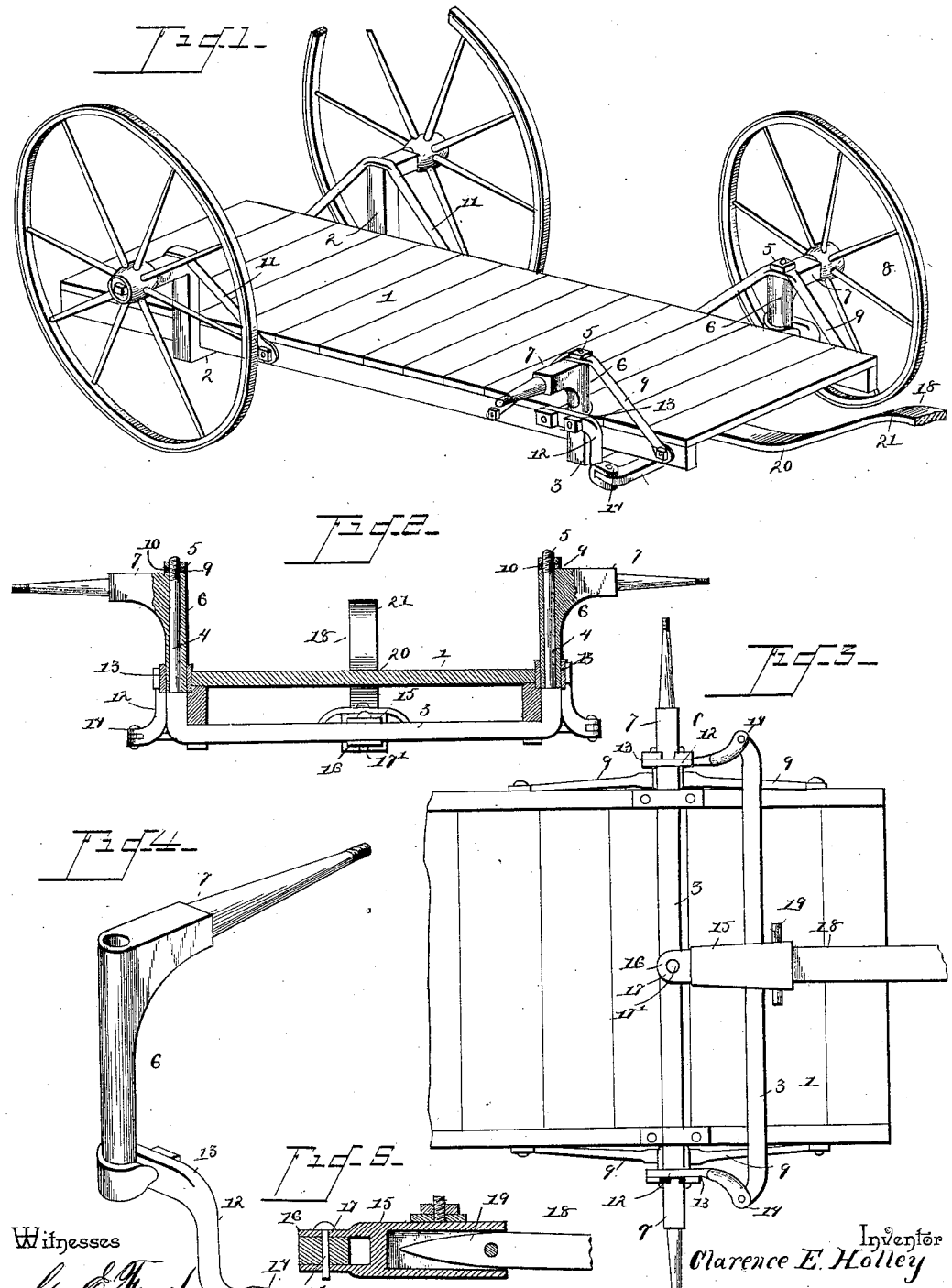
Witnesses
Geo. C. Fuch
H. F. Riley
Inventor
Clarence E. Holley
By his Attorneys,
C.A. Snow & Co.

UNITED STATES PATENT OFFICE.

CLARENCE E. HOLLEY, OF FORT FAIRFIELD, MAINE.

VEHICLE RUNNING-GEAR.

SPECIFICATION forming part of Letters Patent No. 452,376, dated May 19, 1891.

Application filed August 8, 1890. Serial No. 361,468. (No model.)

*To all whom it may concern:*

Be it known that I, CLARENCE E. HOLLEY, a citizen of the United States, residing at Fort Fairfield, in the county of Aroostook and State of Maine, have invented a new and useful Vehicle, of which the following is a specification.

The invention relates to improvements in heavy-draft vehicles for moving stones, safes, and other heavy loads, and in which the platform is usually connected with the front axle by a link or the like, and in which the weight is mainly supported by the rear axle.

The object of the present invention is to simplify and improve the construction of such vehicles and enable the weight to be equally supported by the front and rear axles and to be more easily handled.

The invention consists of the construction and novel combination and arrangement of parts hereinafter fully described, illustrated in the accompanying drawings, and pointed out in the claims hereto appended.

In the drawings, Figure 1 is a perspective view of a vehicle constructed in accordance with this invention. Fig. 2 is a transverse sectional view. Fig. 3 is a reverse plan view. Fig. 4 is a detail perspective view of the wheel-spindle. Fig. 5 is a detail sectional view.

Referring to the accompanying drawings, 1 designates the platform of a heavy-draft vehicle, having its rear supported by a bent axle 2, to allow the platform to be arranged below the spindles to facilitate loading and unloading as is usual in this class of heavy-draft vehicles.

Secured to the lower face of the platform, near the front thereof, is an axle 3, having its ends arranged vertically at the sides of the platform and shouldered, and provided with spindle portions 4, rising from the shoulders, and having threaded ends provided with nuts 5, which secure vertical tubular portions 6 of wheel-spindles 7. The wheel-spindles 7, which receive wheels 8, have formed integral with them the tubular portions 6, which are arranged perpendicular to the spindles and adapted to fit on the axle-spindles 4, and to turn thereon to permit the wheels to move in the usual manner. The vertical portions or spindles 4 of the axle 3 are supported by V-shaped braces 9, which have their ends secured to the sides of the platform, and are provided intermediate of their ends with perforations 10, through which pass the ends of the axle-spindles 4, and the rear axle is supported in a similar manner by braces 11. Each of the tubular portions of the wheel-spindles has clipped to its lower end a bar 12, which is angular and has a central vertical portion and ends 13 and 14 bent horizontally and extending in opposite directions, and the end 14 is bifurcated and pivotally connected to an end of a cross-bar, which is pivoted intermediate of its ends to a tongue-socket 15, having rearwardly-extending plates 16, which are provided with perforations 17, and are arranged upon the upper and lower faces of the axle 3 and connected to the same by a pin 17'. The rear end of the tongue 18 is secured in the tongue-socket 15 by a transverse pin 19, and the tongue is provided with bends 20 and 21, which bring the horizontal portions of the tongue at the proper height to suit the animals. By this arrangement of parts the front of the platform is supported by the front axle, and the weight of the load is equally distributed between the two axles, and the length of the platform is materially increased and a load is more easily handled.

It will be readily seen that by means of the spindles 4 each wheel turns sidewise independently, and thus a fifth-wheel is dispensed with.

What I claim is—

1. In a vehicle, the combination of the front axle having its ends bent vertically and shouldered and provided with integral vertical spindles rising from the shoulders, and the horizontal wheel-spindles having integral vertical tubular portions fitting on the vertical spindles and having their lower ends bearing on the shoulders of the axle, substantially as described.

2. In a vehicle, the combination of the platform, the front axle 3, supporting the same and having integral vertical spindles 4, the horizontal wheel-spindles having integral vertical tubular portions fitting on the axle-spindles, the tongue, the cross-bar connected intermediate of its ends to the tongue, and the bars 12, clipped to the tubular portions of the wheel-spindles and bent downward and arranged in a plane below the platform and pivotally connected to the ends of the cross-bar, substantially as described.

3. In a heavy-draft vehicle, the combination of the platform 1, the rear axle supporting the rear end of the platform, the axle 3, supporting the front end of the same and provided at its ends with vertical spindles, the wheel-spindles having the continuous tubular portions depending from their inner ends and arranged upon the spindle of the axle 3, the angular bars 12, having their upper ends clipped to the said tubular portions and their lower ends bifurcated, the cross-bar pivoted in the bifurcation of the angular bars, and the tongue pivoted to the axle and connected to the cross-bar, substantially as described.

4. In a vehicle, the combination of the platform 1, the rear axle, the axle 3, supporting the front of the platform and provided at its ends with vertical spindles, the wheel-spindles having the continuous tubular portions depending from their inner ends and arranged on the spindles of the axle 3, the angular bars clipped to the said tubular portions, the cross-bars connecting the angular bars, the tongue-socket consisting of the metal box provided with the parallel rearwardly-extending plates pivoted on opposite faces of the axle, said socket having the vertical threaded stem secured to the cross-bar, and the tongue pivoted in the tongue-socket, substantially as described.

In testimony that I claim the foregoing as my own I have hereto affixed my signature in presence of two witnesses.

CLARENCE E. HOLLEY.

Witnesses:
V. E. HOWE,
E. FRANCIS.